United States Patent
Kim et al.

(10) Patent No.: US 8,565,144 B2
(45) Date of Patent: Oct. 22, 2013

(54) SCHEDULING APPARATUS AND METHOD OF RELAY-BASED NETWORK

(75) Inventors: Young-Doo Kim, Seoul (KR);
Mohamed Rashad Salem, Ottawa (CA);
Abdulkareem Adinoyi, Ottawa (CA);
Halim Yanikomeroglu, Ottawa (CA);
David Falconer, Nepean (CA)

(73) Assignee: Samsung Electronics Co., Ltd., Suwon-si (KR)

(*) Notice: Subject to any disclaimer, the term of this patent is extended or adjusted under 35 U.S.C. 154(b) by 911 days.

(21) Appl. No.: 12/567,776

(22) Filed: Sep. 27, 2009

(65) Prior Publication Data

US 2010/0232344 A1    Sep. 16, 2010

(30) Foreign Application Priority Data

Mar. 16, 2009  (KR) ................. 10-2009-0022132

(51) Int. Cl.
| H04B 7/14 | (2006.01) |
| H04B 7/208 | (2006.01) |
| H04B 7/216 | (2006.01) |
| H04B 7/185 | (2006.01) |
| H04B 7/00 | (2006.01) |
| H04W 4/00 | (2009.01) |

(52) U.S. Cl.
USPC ........... 370/315; 370/329; 370/344; 370/335; 455/13.1; 455/522

(58) Field of Classification Search
USPC .......... 370/315, 344, 335, 329; 455/522, 13.1
See application file for complete search history.

(56) References Cited

U.S. PATENT DOCUMENTS

| 6,370,117 | B1 | 4/2002 | Koraitim et al. | |
|---|---|---|---|---|
| 2002/0087716 | A1 | 7/2002 | Mustafa | |
| 2007/0211657 | A1* | 9/2007 | McBeath et al. | 370/329 |
| 2007/0230405 | A1* | 10/2007 | Yin et al. | 370/335 |
| 2007/0264932 | A1* | 11/2007 | Suh et al. | 455/13.1 |
| 2007/0286147 | A1* | 12/2007 | Wang et al. | 370/344 |
| 2008/0205336 | A1 | 8/2008 | Lee et al. | |
| 2009/0005104 | A1* | 1/2009 | Wang et al. | 455/522 |

FOREIGN PATENT DOCUMENTS

| KR | 10-2008-0078151 | 8/2008 |
|---|---|---|
| KR | 10-2008-0082943 | 9/2008 |
| KR | 10-2008-0092222 | 10/2008 |
| KR | 10-2008-0096358 | 10/2008 |

* cited by examiner

Primary Examiner — Ian N Moore
Assistant Examiner — Kiet Tang
(74) Attorney, Agent, or Firm — NSIP Law

(57) ABSTRACT

Disclosed are a scheduling method and apparatus for a relay-based network. The scheduling apparatus may assign a plurality of sub channels to links, with respect to each of a first sub frame and a second sub frame included in s downlink sub frame. The scheduling apparatus may perform scheduling in cases where nodes operated as transmitters and as receivers in the first sub frame and the second sub frame may diversely exist.

14 Claims, 11 Drawing Sheets

FIG. 3

|   | BS | RS1 | RS2 | · · · · | RSM |
|---|----|----|----|----|----|
| 1 ⋮ |  |  |  |  |  |
| n | $D_{n,BS}$ | $D_{n,R1}$ | $D_{n,R2}$ | · · · · | $D_{n,RM}$ |
| ⋮ N |  |  |  |  |  |

SUB CHANNELS

|   | BS | RS1 | RS2 | ....... | RSM |
|---|---|---|---|---|---|
| 1 | $D_{1,0}$ | $D_{1,1}$ | $D_{1,2}$ | ....... | $D_{1,2}$ |
| 2 | $D_{2,0}$ | $D_{2,1}$ | $D_{2,2}$ | ....... | $D_{2,2}$ |
| 3 | $D_{3,0}$ | $D_{3,1}$ | $D_{3,2}$ | ....... | $D_{3,2}$ |
| ⋮ | ⋮ | ⋮ | ⋮ | ....... | ⋮ |
| 10 | $D_{10,0}$ | $D_{10,1}$ | $D_{10,2}$ | ....... | $D_{10,2}$ |
| ⋮ | ⋮ | ⋮ | ⋮ | ....... | ⋮ |
| N | $D_{1,0}$ | $D_{N,1}$ | $D_{N,2}$ | ....... | $D_{N,2}$ |

⬇ UPDATE

420:

|   | BS | RS1 | RS2 | ....... | RSM |
|---|---|---|---|---|---|
| 3 | $D_{3,0}$ | $D_{3,1}$ | $D_{3,2}$ | ....... | $D_{3,M}$ |
| ⋮ | ⋮ | ⋮ | ⋮ | ....... | ⋮ |
| 9 | $D_{9,0}$ | $D_{9,1}$ | $D_{9,2}$ | ....... | $D_{9,M}$ |
| ... | ... | ... | ... | ....... | ... |
| ... | ... | ... | ... | ....... | ... |
| ... | ... | ... | ... | ....... | ... |
| N-1 | $D_{N-1,0}$ | $D_{N-1,1}$ | $D_{N-1,2}$ | ....... | $D_{N-1,M}$ |

- FIRST SUB FRAME -

- SECOND SUB FRAME -

SCHEDULING APPARATUS AND METHOD OF RELAY-BASED NETWORK

CROSS-REFERENCE TO RELATED APPLICATION

This application claims the benefit under 35 U.S.C. §119(a) of a Korean Patent Application No. 10-2009-0022132, filed on Mar. 16, 2009 in the Korean Intellectual Property Office, the entire disclosure of which is incorporated herein by reference for all purposes.

BACKGROUND

1. Field

The following description relates to a scheduling technique for a relay-based network, and more particularly, to a technique of assigning a plurality of sub channels in an orthogonal frequency division multiplexing access (OFDMA) based network.

2. Description of Related Art

In a wireless network, relays may be used to improve a throughput or increase coverage of a cell. However, to reduce interferences, radio resources (for example, sub channels in an OFDMA based network) for the relays may be separately needed.

Limited available sub channels may be assigned to a base station and a plurality of relays so as to reduce the interferences and maximize the throughput of a wireless network. Accordingly, it is desirable to appropriately assign the sub channels in a network having a base station and a plurality of relays.

Also, while transmitting a downlink sub frame, the base station and the plurality of relays may be diversely operated. As an example, performing, by the base station, a downlink communication using the plurality of relays and performing, by the plurality of relays, the downlink communication using user terminals may be simultaneously realized. As another example, the plurality of relays may perform the downlink communication using a plurality of terminals after performing, by the base station, the downlink communication using the plurality of relays. That is, operations of the base station and plurality of relays in the downlink sub frame may be diverse, and the downlink sub frame may be of various types depending on the operations of the base station and plurality of relays.

SUMMARY

In one general aspect, there is provided a scheduling method for a relay-based network, including: assigning, in a first sub frame, a plurality of sub channels to links of a base station based on first demand metrics corresponding to the links of the base station with respect to the plurality of sub channels; and assigning, in a second sub frame, the plurality of sub channels to links of a plurality of relays or the links of the base station based on an assigned result of the first sub frame, wherein a downlink sub frame includes the first sub frame in which the base station transmits a downlink signal to the plurality of relays or a plurality of terminals and the second sub frame in which the plurality of relays or the base station transmits a downlink signal to the plurality of terminals.

The assigning, in the second sub frame, of the plurality of sub channels may include assigning the plurality of sub channels to the links of the base station or to the links of the plurality of relays, based on changes in a queue length of the base station with respect to the plurality of terminals or based on changes in a queue length of the plurality of relays with respect to the plurality of terminals, the changes being generated by assigning the plurality of sub channels to the links of the base station in the first sub frame.

The scheduling method may further include calculating the first demand metrics based on a queue length of the base station with respect to the plurality of relays or to the plurality of terminals and a signal to interference plus noise ratio (SINR) of the plurality of relays or of the plurality of terminals with respect to the base station.

The assigning, in the second sub frame, of the plurality of sub channels may include calculating second demand metrics corresponding to the links of the plurality of relays or the links of the base station, based on the assigned result of the first sub frame, and assigning the plurality of sub channels to the links of the plurality of relays or the links of the base station, based on the second demand metrics.

The calculating of the second demand metrics may include updating a queue length of the base station with respect to the plurality of terminals or a queue length of the plurality of relays with respect to the plurality of terminals, based on the assigned result of the first sub frame, and calculating the second demand metrics, based on the updated queue length of the base station or the updated queue length of the plurality of relays and based on an SINR of the plurality of relays or the base station with respect to the plurality of terminals.

The assigning, in the first sub frame, of the plurality of sub channels may include assigning the plurality of sub channels to the links of the base station using a Hungarian algorithm, or the assigning, in the second sub frame, of the plurality of sub channels may include assigning the plurality of sub channels to the links of the plurality of relays or to the links of the base station using the Hungarian algorithm.

The assigning, in the second sub frame, of the plurality of sub channels may include equally assigning the plurality of sub channels to each of the plurality of relays or to the base station In another general aspect, there is provided a scheduling method for a relay-based network, including: in response to a downlink sub frame being divided into multiple types depending on whether a plurality of terminals are operated as a plurality of receivers in a first sub frame and whether a base station is operated as a transmitter in a second sub frame, selecting a type used in the relay-based network from among the multiple types based on at least one of a number of a plurality of relays and a distribution of the plurality of terminals; assigning, in the first sub frame, a plurality of sub channels to links of the base station based on first demand metrics corresponding to the links of the base station with respect to the plurality of sub channels; and assigning, in the second sub frame, the plurality of sub channels to links of the plurality of relays or to the links of the base station, based on an assigned result of the first sub frame, wherein a downlink sub frame includes the first sub frame in which the base station is operated as the transmitter and also includes the second sub frame in which the plurality of terminals are operated as the plurality of receivers.

The assigning, in the second sub frame, of the plurality of sub channels may include assigning the plurality of sub channels to the links of the base station or the links of the plurality of relays, based on changes in a queue length of the base station with respect to the plurality of terminals or based on changes in a queue length of the plurality of relays with respect to the plurality of terminals, the changes being generated by assigning the plurality of sub channels to the links of the base station in the first sub frame.

In still another general aspect, there is be provided a scheduling apparatus for a relay-based network, including: a first assigning unit to assign, in a first sub frame, a plurality of sub channels to links of a base station based on first demand metrics corresponding to the links of the base station with respect to the plurality of sub channels; and a second assigning unit to assign, in a second sub frame, the plurality of sub channels to links of a plurality of relays or to the links of the base station, based on an assigned result of the first sub frame, wherein a downlink sub frame includes the first sub frame in which the base station transmits a downlink signal to the plurality of relays or a plurality of terminals and the second sub frame in which the plurality of relays or the base station transmits a downlink signal to the plurality of terminals.

The scheduling apparatus may further include a metric calculating unit to calculate the first demand metrics, based on a queue length of the base station with respect to the plurality of relays or with respect to the plurality of terminals and based on an SINR of the plurality of relays or of the plurality of terminals with respect to the base station.

The first assigning unit may assign the plurality of sub channels to the links of the base station or to the links of the plurality of relays, based on changes in a queue length of the base station with respect to the plurality of terminals or based on changes in a queue length of the plurality of relays with respect to the plurality of terminals, the changes being generated by assigning the plurality of sub channels to the links of the base station in the first sub frame.

The metric calculating unit may calculate second demand metrics corresponding to the links of the plurality of relays or the links of the base station, based on the assigned result of the first sub frame, and the second assigning unit may assign the plurality of sub channels to the links of the plurality of relays or to the links of the base station, based on the second demand metrics.

The metric calculating unit may update the queue length of the base station with respect to the plurality of terminals or updates the queue length of the plurality of relays with respect to the plurality of terminals, based on the assigned result of the first sub frame.

Other features and aspects will become apparent to those skilled in the art from the following detailed description, the drawings, and the claims.

BRIEF DESCRIPTION OF THE DRAWINGS

FIG. 3 illustrates an exemplary table including demand metrics corresponding to links of a base station and of a plurality of relay stations, with respect to a plurality of sub channels.

FIG. 4 illustrates exemplary tables including demand metrics corresponding to links of a base station and of a plurality of relay stations, with respect to a plurality of sub channels, when a Hungarian algorithm is performed first and second times.

Figure 1:
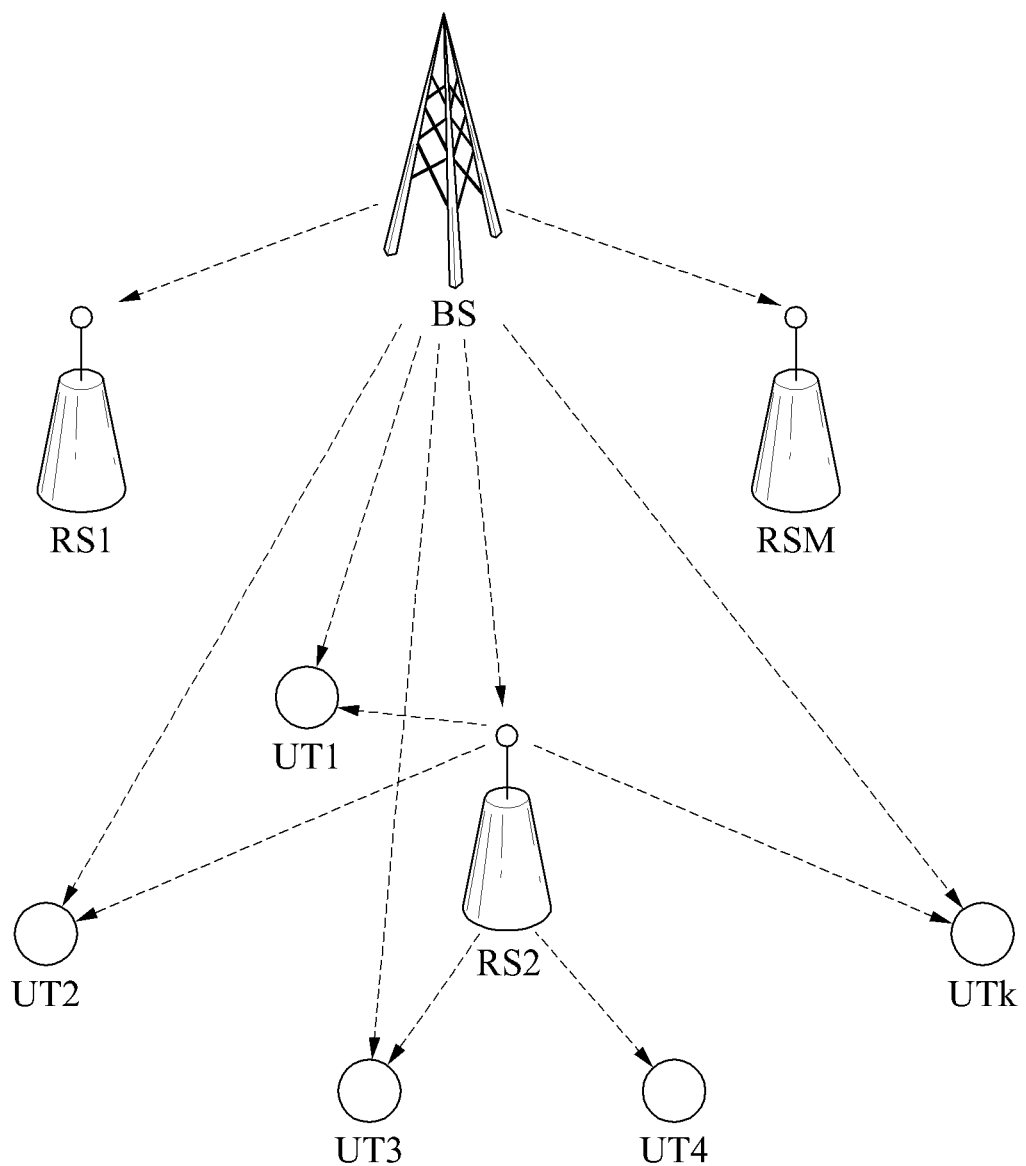
FIG. 1 is a diagram illustrating an exemplary relay-based network.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 illustrates an exemplary relay-based network.

Referring to FIG. 1, the exemplary relay-based network includes a base station (BS), a plurality of relay stations (RS), and a plurality of user terminals (UT). In FIGS. 1 through 4, for the convenience of the illustration, it is assumed that the base station and the plurality of relay stations in a downlink sub frame simultaneously perform a downlink communication.

In the downlink communication, a plurality of links may be generated between the base station, the plurality of relay stations, and the plurality of user terminals. For example, the base station may be connected with a relay station 1 (RS1), a relay station 2 (RS2), a relay station M (RSM), and user terminals (UT1, UT2, UT3, UT4, and UTK) through the plurality of links, and the relay stations (RS1, RS2, and RSM) may be connected with the user terminals (UT1, UT2, UT3, UT4, and UTK) through the plurality of links.

In the downlink sub frame, when the base station and the plurality of relay stations simultaneously perform the downlink communication, a plurality of sub channels that are available may need to be appropriately assigned to the base station and the plurality of relay stations. In this case, to assign the plurality of sub channels, demand metrics, which will be further described below, may be calculated, and a Hungarian algorithm using the demand metrics may be performed.

In the base station, queues corresponding to the user terminals (UT1, UT2, UT3, UT4, and UTK) and the plurality of relay stations (RS1, RS2, and RSM) may exist, and in the plurality of relay stations, queues corresponding to the user terminals may exist. Here, a length of the queues existing in the base station (also referred to as "queue length of base station") and a length of the queues existing in the plurality of relay stations (also referred to as "queue length of plurality of relay stations") may be used as factors calculating demand metrics. In addition, an achievable data rate may be used as another factor calculating the demand metrics. The achievable data rate may be calculated as a basis of a signal to interference plus noise ratio (SINR).

Demand metrics of the base station with respect to the plurality of sub channels will be described with reference to FIG. 1, and demand metrics of the relay station with respect to the plurality of sub channels will be described with reference to FIG. 2. A method of calculating the demand metrics described with reference to FIGS. 1 and 2 may be slightly different when the downlink sub frame is divided into a first sub frame and a second sub frame, which will be described with reference to FIGS. 5 to 11.

Queues for the plurality of user terminals (UT1, UT2, UT3, UT4, and UTK) may exist in the base station and the plurality of relay stations (RS1, RS2, and RSM). As an example, a demand metric $D_{n,BS-Rm}$ of the base station with respect to links (BS–Rm) between the base station (BS) and a relay station (Rm) may be represented as:

$$D_{n,BS-Rm} = R_{BS,Rm,n} \max_k [\max\{Q_k^{BS} - Q_k^{Rm}, 0\}], \quad \text{[Equation 1]}$$

wherein k denotes an index of the user terminals, Rm denotes an index of the relay stations, BS-Rm denotes a link between the base station (BS) and a relay station corresponding to Rm, n denotes an index of the sub channels, and Q denotes a queue length. Also, $Q_k^{BS}$ denotes a length of a queue existing in the base station for a user terminal k, and $Q_k^{Rm}$ denotes a length of a queue existing in the relay station Rm for the user terminal k. Also, $R_{BS,Rm,n}$ denotes an achievable data rate of the base station with respect to the relay station Rm in an n-th sub channel, and is calculated based on an SINR of the relay station Rm with respect to the base station in the n-th sub channel. For reference, information about $R_{BS,Rm,n}$ or information about the SINR of the relay station Rm with respect to the base station may be provided to the base station in advance.

Also, a demand metric $D_{n,BS-k}$ of the base station with respect to links (BS-k) between the base station and the user terminal k may be represented as:

$$D_{n,BS-k} = \max_k (R_{BS,k,n} \cdot Q_k^{BS}), \quad \text{[Equation 2]}$$

wherein $R_{BS,k,n}$ denotes an achievable data rate of the base station with respect to the user terminal k.

Here, a demand metric $D_{n,BS}$ of a final base station may be represented, based on Equations 1 and 2, as:

$$D_{n,BS} = \max_{j \in \{m \cup K\}} \{D_{n,BS-j}\}, \quad \text{[Equation 3]}$$

wherein M denotes a universal set of relay stations, and K denotes a universal set of user terminals.

In this case, a demand metric corresponding to a best link from among links of M+K base stations with respect to each of the plurality of sub channels may be determined as a final demand metric of the base station with respect to each of the plurality of sub channels. Also, in order to appropriately assign the plurality of sub channels, the final demand metric of the base station with respect to each of the plurality of sub channels may be used, which will be further described below.

Figure 2:
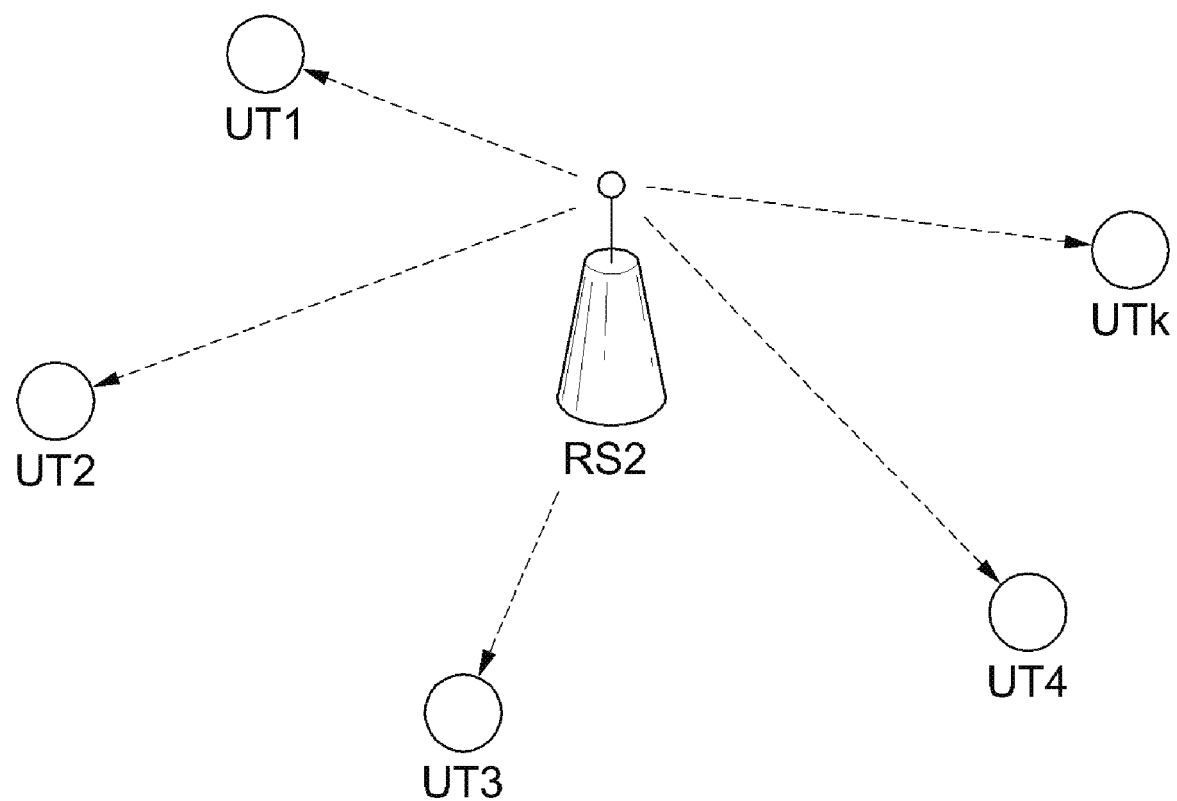
FIG. 2 is a diagram illustrating links between a relay station 2 (RS2) and user terminals in the relay-based network of FIG. 1.

FIG. 2 illustrates links between a relay station 2 (RS2) and user terminals in the relay-based network of FIG. 1.

Referring to FIG. 2, links of the relay station 2 (RS2) from among the plurality of relay stations illustrated in FIG. 1 are illustrated. The links generated between the relay station 2 (RS2) and user terminals UT1, UT2, UT3, UT4, and UTK may be referred to as links of the relay station 2 (RS2).

In this case, a demand metric $D_{n,R2}$ of the relay station 2 (RS2) with respect to a link $R_2$-k between the relay station 2 (RS2) and a user terminal k may be represented as:

$$D_{n,R2} = \max_k (R_{R2,k,n} \cdot Q_k^{R2}), \quad \text{[Equation 4]}$$

wherein $Q_k^{R2}$ represents a length of a queue existing in the relay station 2 (RS2) for the user terminal k, and $R_{R2,k,n}$ represents an achievable data rate of the relay station 2 (RS2) with respect to the user terminal k in an n-th sub channel.

FIG. 3 illustrates a table including demand metrics corresponding to links of a base station and of a plurality of relay stations, with respect to a plurality of sub channels.

Referring to FIGS. 1 through 3, demand metrics of the base station with respect to the plurality of sub channels and demand metrics of the plurality of relay stations, which are calculated through Equations 1 through 4, may be recorded in the table.

Here, for example, a best link from among links of the base station in the n-th sub channel may be a link between the base station and a relay station 1 (RS1), which is assumed to be a link associated with a queue for a user terminal 3. In this case, with respect to an n-th sub channel from among N sub channels, a demand metric $D_{n,BS}$ of the base station may be represented as:

$$D_{n,BS} = R_{BS,R1,n}(Q_3^{BS} - Q_3^{R1}), \quad \text{[Equation 5]}$$

wherein $R_{BS,R1,n}$ represents an achievable data rate of the base station with respect to the relay station 1 (RS1) in the n-th sub channel, $Q_3^{BS}$ represents a length of a queue existing in the base station for a user terminal 3, and $Q_3^{R1}$ represents a length of a queue existing in the relay station 1 for the user terminal 3.

When it is assumed that a best link from among links of the relay station 1 is a link between the relay station 1 (RS1) and the user terminal 3, a demand metric $D_{n,R1}$ of the relay station 1 (RS1) may be represented as:

$$D_{n,R1} = R_{R1,UT3,n} Q_3^{R1}, \quad \text{[Equation 6]}$$

wherein $R_{R1,UT3,n}$ represents an achievable data rate of the relay station 1 with respect to the user terminal 3 in the n-th sub channel.

When it is assumed that a best link of the relay station 2 (RS2) is a link between the relay station 2 (RS2) and the terminal 2, a demand metric $D_{n,R2}$ of the relay station 2 (RS2) may be represented as:

$$D_{n,R2} = R_{R2,UT2,n} Q_2^{R2}, \quad \text{[Equation 7]}$$

wherein $R_{R2,UT2,n}$ represents an achievable data rate of the relay station 2 (RS2) with respect to the user terminal 2, and $Q_2^{R2}$ represents a length of a queue for the user terminal 2 existing in the relay station 2 (RS2).

Since a demand metric $D_{n,RM}$ of a relay station M may be calculated in a similar method as that in Equations 5 to 7, further descriptions will be omitted for conciseness.

Accordingly, demand metrics of the base station and of the plurality of relay stations may be calculated with respect to all sub channels, and the calculated demand metrics may be recorded in a table. In this case, the demand metrics recorded in the table may be used as a basis for assigning the sub channels through, for example, a Hungarian algorithm.

FIG. 4 illustrates tables 410 and 420 including demand metrics corresponding to links of a base station and of a plurality of relay stations, with respect to a plurality of sub channels, when a Hungarian algorithm is performed for first and second times.

The Hungarian algorithm may be repeatedly performed to appropriately assign the sub channels to the base station and to the plurality of relay stations. The table 410 of FIG. 4 may correspond to a table where demand metrics are recorded in a first iteration of the Hungarian algorithm, and the table 420 of FIG. 4 may correspond to a table where demand metrics are recorded in a second iteration thereof.

Referring to the table 410, M+1 demand metrics of M relay stations and of the base station with respect to each of N sub channels may exist. In this case, in the first iteration of the Hungarian algorithm, one demand metric may be selected from M+1 demand metrics with respect to each of N sub channels. For example, a single demand metric may be selected from each of N rows of the table 410, and a single demand metric may be selected from the base station and from each of the M relay stations.

Here, sub channels may be assigned to a link associated with the selected demand metrics, and the assigned sub channels may be used for queues corresponding to the selected demand metrics. In the first iteration of the Hungarian algorithm, M+1 sub channels from among N sub channels may be assigned to the base station and M relay stations.

In the first iteration of the Hungarian algorithm, the table may be updated when M+1 sub channels are assigned. For example, demand metrics calculated based on queues corresponding to the assigned M+1 sub channels may be updated. In addition, M+1 sub channels may be assigned, whereby an SINR of relay stations or an SINR of terminals may be changed, or an achievable data rate of the base station or an achievable data rate of the relay stations may be changed. As a result, demand metrics for the remaining sub channels may be re-calculated.

Also, referring to the table 420, demand metrics updated based on an assigned result obtained in the first iteration of the Hungarian algorithm are illustrated. The second iteration of the Hungarian algorithm may be performed with respect to the table 420. In the second iteration, any one of M+1 demand metrics may be selected with respect to each of N−M−1 sub channels. Accordingly, in the second iteration, M+1 sub channels of N−M−1 sub channels may be assigned to the base station and to M relay stations.

The Hungarian algorithm may be repeatedly performed until all sub channels are assigned to the base station and to M relay stations. The sub channels may be equally assigned to the base station and to M relay stations. In this case, a number of sub channels assigned to the base station and to M relay stations may be N/(M+1).

Figure 5:
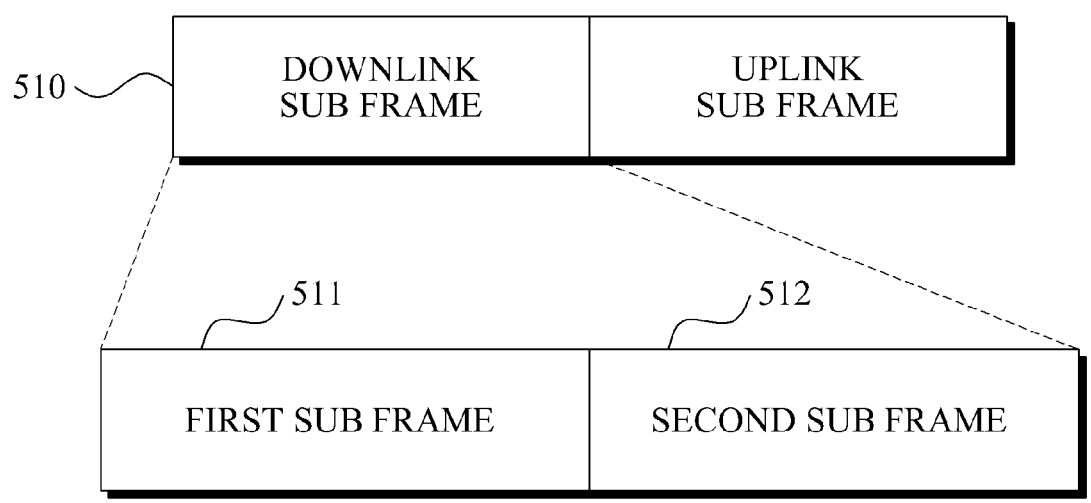
FIG. 5 is a diagram illustrating an exemplary data frame including a downlink sub frame and an uplink sub frame.

FIG. 5 illustrates an exemplary data frame 510 including a downlink sub frame and an uplink sub frame.

Referring to FIG. 5, the data frame 510 may be divided into a downlink sub frame and an uplink sub frame. The downlink sub frame may be divided into a first sub frame 511 and a second sub frame 512.

For example, when the downlink sub frame is not divided into a plurality of sub frames, descriptions given with reference to FIGS. 1 through 4 may be adapted. However, when the downlink sub frame is divided into a plurality of sub frames such as the first sub frame 511 and the second sub frame 512, the demand metrics described with reference to FIGS. 1 through 4 may be calculated. In this case, a method used may be slightly modified.

As an illustration, when the base station transmits a signal to a specific relay station in the sub frame 511, a length of a queue existing in the base station may be decreased, however, a length of a queue existing in the specific relay station may be increased. In this case, to assign sub channels in the sub frame 512, the decreased length of the queue and the increased length of the queue may be considered.

Accordingly, to assign the sub channels in the downlink sub frame, a scheduling algorithm may be performed in each of the first sub frame 511 and the second sub frame 512, and the sub channels may be assigned to the second sub frame 512 based on a scheduled result in the first sub frame 511 (for example, the assigned result of sub channels).

Figure 6A:
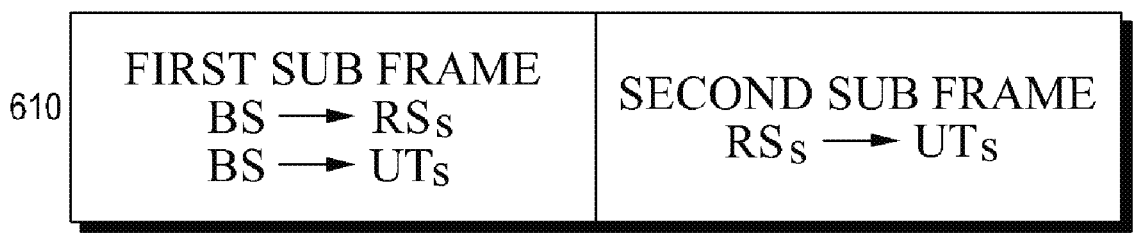
FIGS. 6A through 6C are diagrams illustrating various types of exemplary downlink sub frames.
Figure 6B:
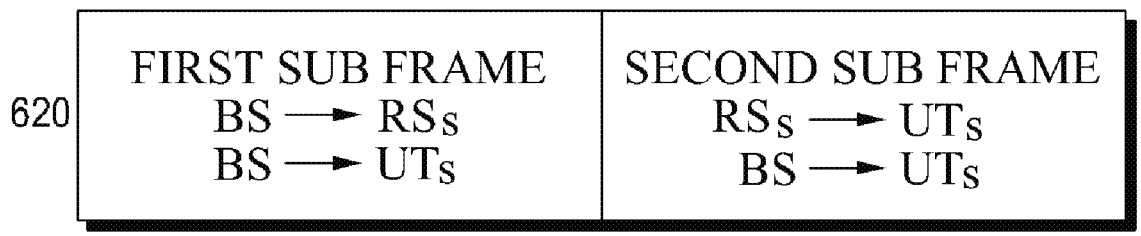
Figure 6C:
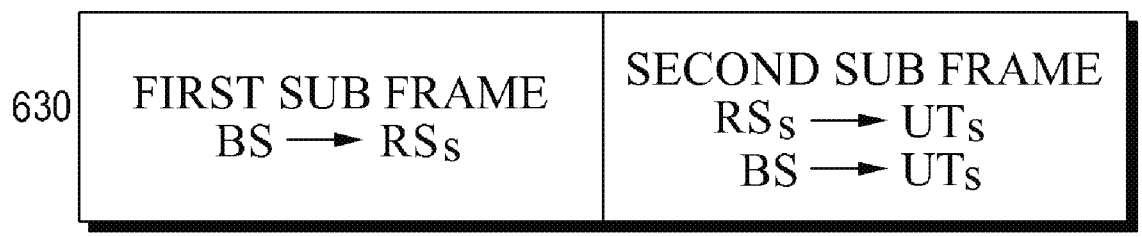

FIGS. 6A through 6C illustrate various types of exemplary downlink sub frames.

Referring to FIGS. 6A through 6C, downlink sub frames of different types are illustrated. The downlink sub frame may be of various types depending on whether a plurality of terminals are operated as a receiver in the first sub frame. For example, terminals may be operated as a receiver in the first sub frame of sub frames 610 and 620 of FIGS. 6A and 6B, however, only relay stations may be operated as the receivers in the first sub frame of the downlink sub frame 630 of FIG. 6C.

Also, the downlink sub frame may be of various types depending on whether the base station is operated as a transmitter in the second sub frame. For example, the base station may be operated as the transmitter in the second sub frame of the downlink sub frames 620 and 630 of FIGS. 6B and 6C, however, only relay stations may be operated as the transmitters in the second sub frame of the downlink sub frame 610 of FIG. 6A.

It is understood that the downlink sub frame may be of various types other than the exemplary downlink sub frames 610 to 630, and further descriptions thereof will be omitted for conciseness.

In the first sub frame of the downlink sub frame 610 of FIG. 6A, the base station may perform a downlink communication with the relay stations, and simultaneously perform a downlink communication with user terminals. Also, in the second sub frame of the downlink sub frame 610 of FIG. 6A, the relay stations may perform a downlink communication with the user terminals. In this case, when the base station performs the downlink sub frame with the relay stations in the first sub frame, a length of the queue existing in the relay stations may be increased, and thus sub channels may be assigned to the relay stations based on the increased length of the queue of the relay stations.

Also, in the first sub frame of the downlink sub frame 620 of FIG. 6B, the base station may perform a downlink communication with the relay stations, similar to the first sub frame of the downlink sub frame 610 of FIG. 6A, and simultaneously perform the downlink communication with the user terminals. In the second sub frame of the downlink sub frame 620 of FIG. 6B, unlike in the second sub frame of the downlink sub frame 610 of FIG. 6A, the relay stations may perform the downlink communication with the user terminals, and simultaneously, the base station may perform the downlink communication with the user terminals. In each of the first sub frame and the second sub frame of the downlink sub frame 620 of FIG. 6B, sub channels may be appropriately assigned.

Also, in the first sub frame of the downlink sub frame 630 of FIG. 6C, the base station may perform the downlink communication with the relay stations, and in the second sub frame, the relay stations and the base station may perform the downlink communication with the user terminals.

Figure 7:
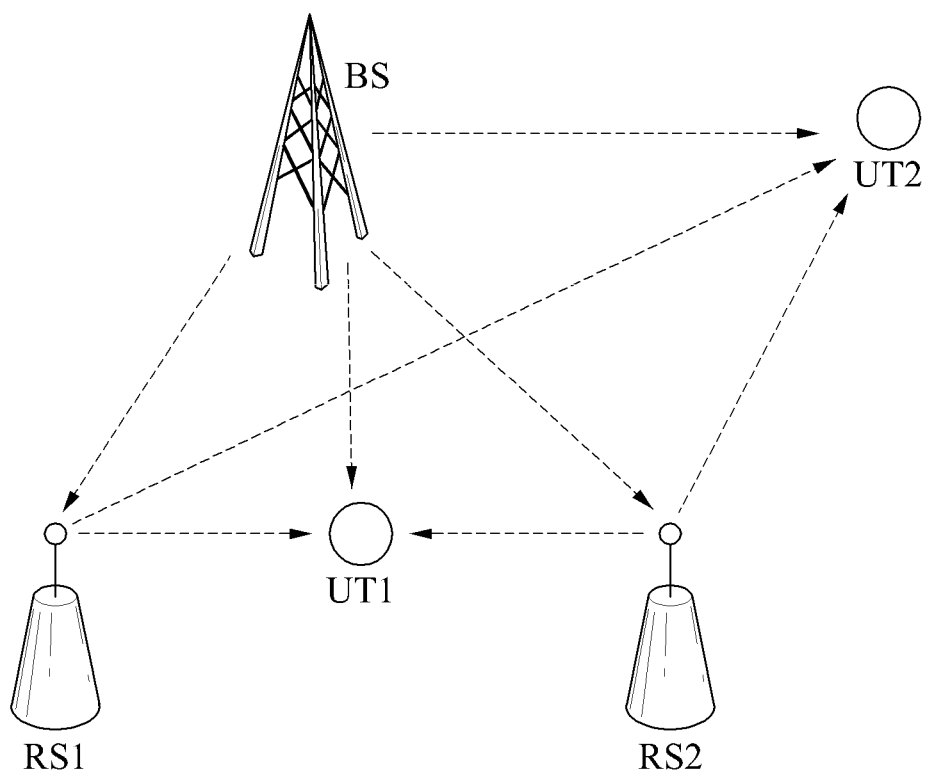
FIG. 7 is a diagram illustrating exemplary links capable of being exhibited in a first sub frame.

FIG. 7 illustrates exemplary links capable of being exhibited in a first sub frame.

Referring to FIG. 7, in the first sub frame, the base station or the relay stations may perform the downlink communication.

For example, referring to FIGS. 6A and 6B, in the first sub frame, the base station may perform the downlink communication with the relay stations, and simultaneously perform the downlink communication with the user terminals. However, referring to FIG. 6C, in the first sub frame, the base station may perform the downlink communication only with the relay stations, and does not perform the downlink communication with the user terminals.

Figure 8:
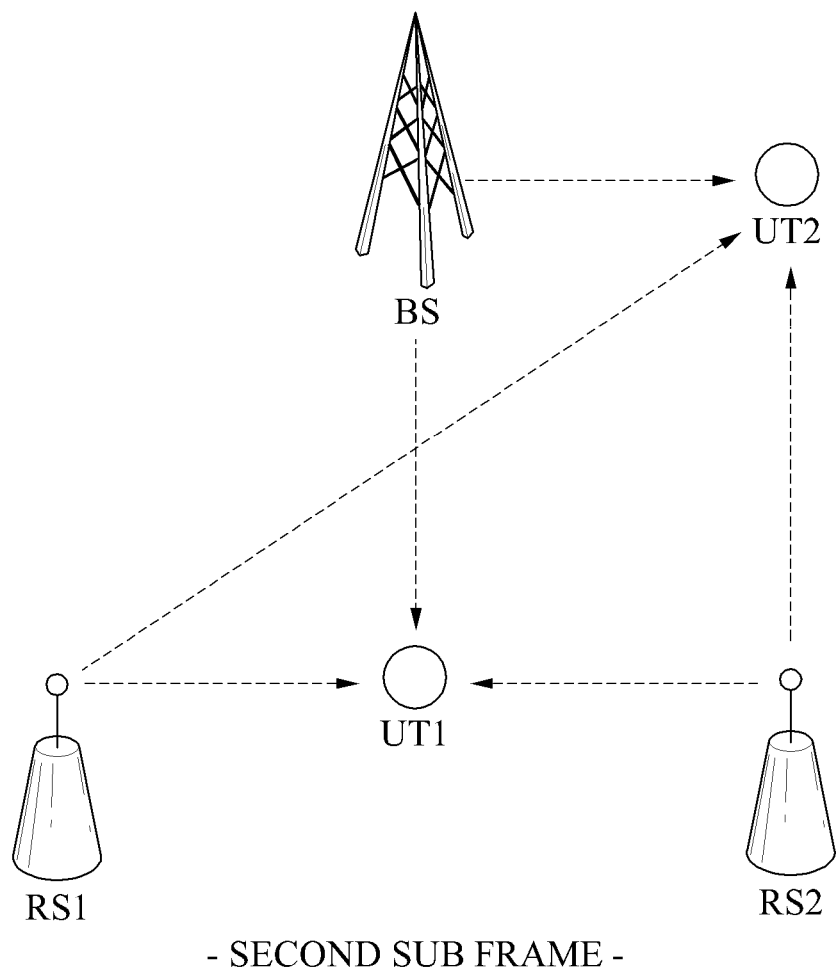
FIG. 8 is a diagram illustrating exemplary links capable of being exhibited in a second sub frame.

FIG. 8 illustrates exemplary links capable of being exhibited in a second sub frame.

Referring to FIG. 8, in the second sub frame, the relay stations may perform a downlink communication with user terminals. In this case, the base station may selectively perform the downlink communication with the user terminals depending on a type of the downlink sub frame. For example, in a case of sub frames 620 and 630 of FIGS. 6B and 6C, the base station may perform the downlink communication with the user terminals in the second frame, however, in a case of sub frame 610 of FIG. 6A, only relay stations may perform the downlink sub frame with the relay station.

An exemplary network may have a centralized structure in which a base station assigns sub channels. In this case, the base station may calculate, in a first sub frame, demand metrics (also referred to as first demand metrics) of the base station with respect to a plurality of sub channels. In the first sub frame, links between the base station and relay stations may exist. However, in the first sub frame, links between the base station and user terminals may or may not exist depending on a type of a downlink sub frame. In the first sub frame, a first demand metric $D_{n,BS}^{(1)}$ corresponding to links of the base stations with respect to an n-th sub channel may be calculated using Equation 8 below:

$$D_{n,BS-k}^{(1)} = R_{BS,k,n} \cdot Q_k^{BS},$$ [Equation 8]

$$D_{n,BS-Rm}^{(1)} = R_{BS,Rm,n} \max_k \{(Q_k^{BS} - Q_k^{Rm})^+\},$$

$$j_n^* = \arg\max_j \{D_{n,BS-j}^{(1)}\}, \text{ and}$$

$$D_{n,BS}^{(1)} = \max_j \{D_{n,BS-j}^{(1)}\},$$

wherein $D_{n,BS-k}^{(1)}$ represents a demand metric with respect to a link between the base station and a user terminal k, with respect to the n-th sub channel in the first sub frame, and $D_{n,BS-Rm}^{(1)}$ represents a demand metric with respect to a link between the base station and a relay station Rm, with respect to the n-th sub channel in the first sub frame. Also, when A is a negative number, (A)$^+$ is '0', and when A is a positive number, (A)$^+$ is 'A'. Also, $R_{BS,k,n}$ represents an achievable data rate of the base station with respect to the user terminal k in the n-th sub channel, and $R_{BS,Rm,n}$ represents an achievable data rate of the base station with respect to the relay station Rm in the n-th sub channel. j represents an index of links between the base station and the user terminals and between the base station and the relay stations.

Accordingly, the first demand metrics may be determined with respect to all of N sub channels, and the base station may appropriately assign the sub channels based on N first demand metrics. In this case, the base station may select a maximum first demand metric from among N first demand metrics using Equation 9 below, and a corresponding sub channel may be assigned to a link of the base station corresponding to the maximum first demand metric.

$$\hat{n} = \arg\max_n \{D_{n,BS}^{(1)}\}.$$ [Equation 9]

When the maximum first demand metric is selected, the base station may update the remaining first demand metrics based on a change in a length of a queue of a user terminal associated with the selected first demand metric. Then, the base station may repeat a process described with reference to Equations 8 and 9, so as to equally assign N sub channels to links of the base station.

When all sub channels are assigned to links of the base station in the first sub frame, the base station may assign sub channels to links of the relay stations and of the base station in a second sub frame based on the assigned result of the sub channels in the first sub frame. For example, a length of queues existing in the base station and a length of queues existing in the relay stations may vary depending on whether the sub channels are assigned to predetermined links in the first sub frame. Accordingly, the base station may update information about the length of the queues existing in the base station and in the relay stations based on the assigned result of the sub channels in the first sub frame. Also, the base station may calculate second metrics corresponding to links of the relay stations and to links of the base station using the updated information, and may assign the sub channels in the sub frame based on the second demand metrics.

In this case, the second metrics may be calculated using Equation 10 below:

$$D_{n,Rm}^{(2)} = \max_k (r_{Rm,k,n} \cdot q_k^{Rm}), \text{ and}$$ [Equation 10]

$$D_{n,BS}^{(2)} = \max_k (r_{BS,k,n} \cdot q_k^{BS}),$$

wherein $D_{n,Rm}^{(2)}$ represents a second demand metric of a relay station Rm in an n-th sub channel of the second sub frame, and $D_{n,BS}^{(2)}$ represents a second demand metric of the base station in the n-th sub channel of the second sub frame. $q_k^{Rm}$ represents a length of a queue for a user terminal k existing in the relay station Rm, and is updated based on an assigned result in the first sub frame. $q_k^{BS}$ represents a length of a queue for a user terminal k existing in the base station, and is updated based on the assigned result in the first sub frame. $r_{BS,k,n}$ represents an achievable data rate of the base station for the user terminal k in the n-th sub channel of the second sub frame, and $r_{Rm,k,n}$ represents an achievable data rate of the relay station Rm for the user terminal k in the n-th sub channel of the second sub frame.

When the relay stations and the base station are operated as transmitters in the second sub frame, all of second demand metrics of the relay stations and of the base station may be calculated, and when only the relay stations are operated as the transmitters, only the second demand metrics of the relay stations may be calculated.

When the second demand metrics of the relay stations and of the base station are calculated, the base station may appropriately assign a plurality of sub channels to links of the relay stations or to links of the base station for the second sub frame using the table described with reference to FIG. 3. For example, the base station may assign the plurality of sub channels using the Hungarian algorithm. Detailed descriptions of the Hungarian algorithm will be omitted for conciseness.

Accordingly, the exemplary base station may individually perform a scheduling in each of the sub frames included in the downlink sub frame, even though the downlink sub frame may be of various types. The base station may assign the sub channels in a current sub frame based on an assigned result in a previous sub frame, so as to optimize scheduling.

With reference to the sub frames 610, 620, and 630 of FIGS. 6A, 6B, and 6C, respectively, exemplary implementations will be described below.

With respect to assignment in a first sub frame, in the sub frames 610, 620, and 630, a first demand metric corresponding to a link between the base station and the user terminal k in an n-th sub channel may be $D_{n,BS\text{-}k}^{(1)} = R_{BS,k,n} \cdot Q_k^{BS}$. Also, with respect to the sub frames 610, 620, and 630, a first demand metric corresponding to a link between the base station and the relay station Rm in the n-th sub channel may $$D_{n,BS-Rm}^{(1)} = R_{BS,Rm,n} \max_k \{(Q_k^{BS} - Q_k^{Rm})^+\}.$$

With respect to the sub frame 630, $$D_{n,BS-Rm}^{(1)} = R_{BS,Rm,n} \max_k \{(Q_k^{BS} - Q_k^{Rm})^+\}$$

may be determined as a final first demand metric, however, with respect to the sub frames 610 and 620 of FIGS. 6A and 6B, $$D_{n,BS}^{(1)} = \max_j \{D_{n,BS-j}^{(1)}\}$$

may be determined as a final second metric using $$D_{n,BS-Rm}^{(1)} = R_{BS,Rm,n} \max_k \{(Q_k^{BS} - Q_k^{Rm})^+\}$$

and $$j_n^* = \operatorname*{argmax}_j \{D_{n,BS-j}^{(1)}\}.$$

Also, any one of the sub channels may be assigned to a corresponding link of the base station or of the relay station using $$\hat{n} = \operatorname*{argmax}_n \{D_{n,BS}^{(1)}\}.$$

The above described process may be repeated until all sub channels are assigned.

In the second sub frame of the downlink sub frame of FIG. 6A, only relay stations may be operated as transmitters, and thus second demand metrics of the relay stations may be determined as $$D_{n,Rm}^{(2)} = \max_k (r_{Rm,k,n} q_k^{Rm}).$$

A plurality of sub channels in the second sub frame may be assigned to links of the relay stations based on the second demand metrics of the relay stations.

In the second sub frame of the downlink sub frame of FIGS. 6B and 6C, all of the relay stations and the base station may be operated as the transmitters. Accordingly, the second demand metrics of the relay stations may be determined as $$D_{n,Rm}^{(2)} = \max_k (r_{Rm,k,n} \cdot q_k^{Rm}),$$

and the second demand metrics of the base station may be determined as $$D_{n,BS}^{(2)} = \max_k (r_{BS,k,n} \cdot q_k^{BS}).$$

Also, in the second sub frame, the plurality of sub channels may be assigned to the relay stations and to the base station based on the second demand metrics of the relay stations and the second demand metrics of the base station.

Figure 9:
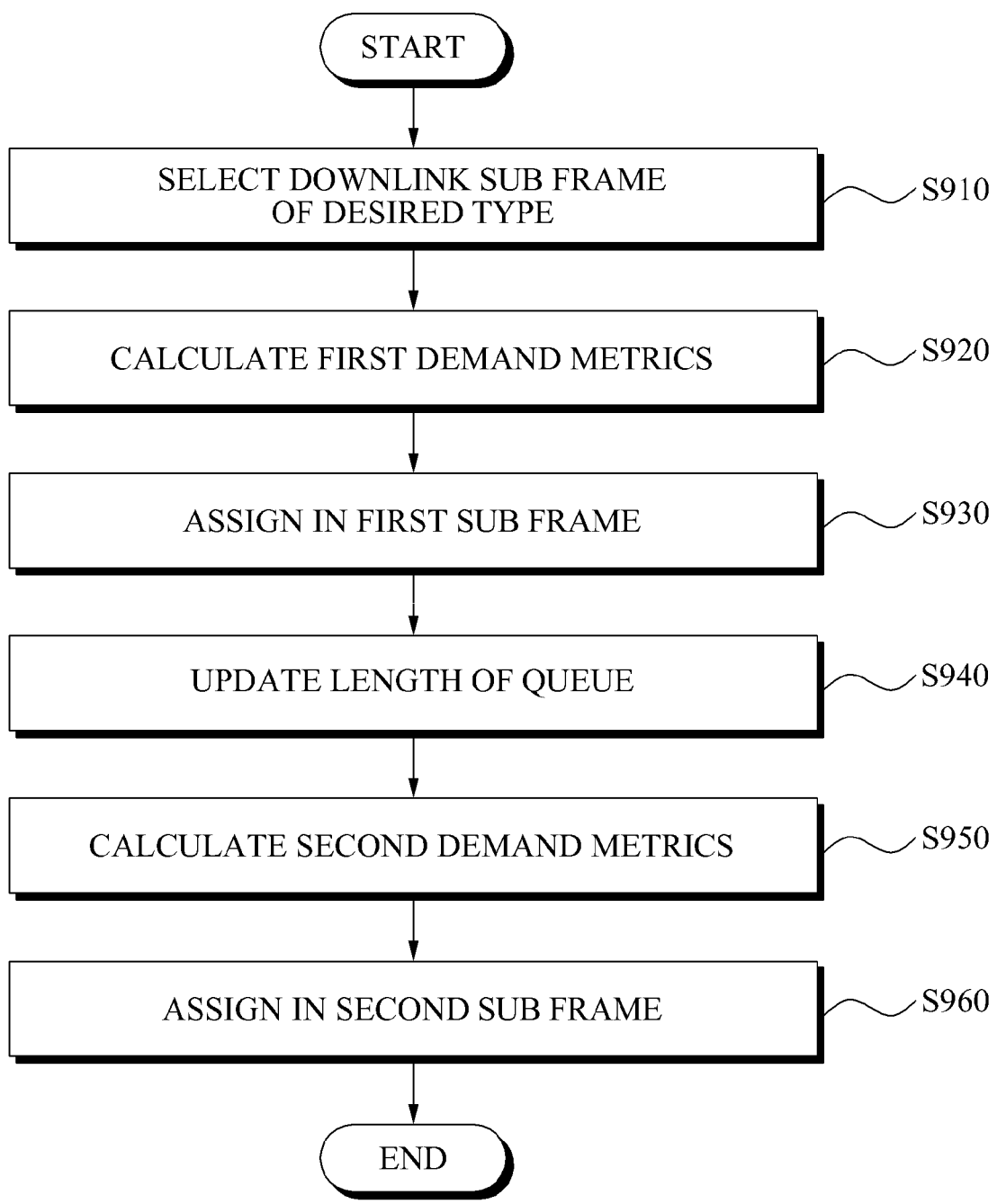
FIG. 9 is a flowchart illustrating an exemplary scheduling method for a relay-based network.

FIG. 9 is a flowchart illustrating an exemplary scheduling method for a relay-based network.

Referring to FIG. 9, in operation S910, a downlink sub frame to be used is selected from among various types of sub frames. Selecting of a downlink sub frame will be further described with reference to FIG. 11.

In operation S920, first demand metrics corresponding to links of a base station with respect to a plurality of sub channels are calculated.

In operation S930, the plurality of sub channels are assigned to links of the base station in a first sub frame based on the first demand metrics. For example, the plurality of sub channels may be equally assigned to the links of the base stations using the Hungarian algorithm.

In operation S940, a length of queues existing in the base station or a length of queues existing in relay stations is updated based on the assigned result obtained in the first sub frame.

In operation S950, second demand metrics are calculated based on the updated length of the queues existing in the relay stations or based on the updated length of the queues existing in the base station.

In operation S960, the plurality of sub channels are assigned to links of the plurality of relay stations and to links of the base station in the second sub frame.

Figure 10:
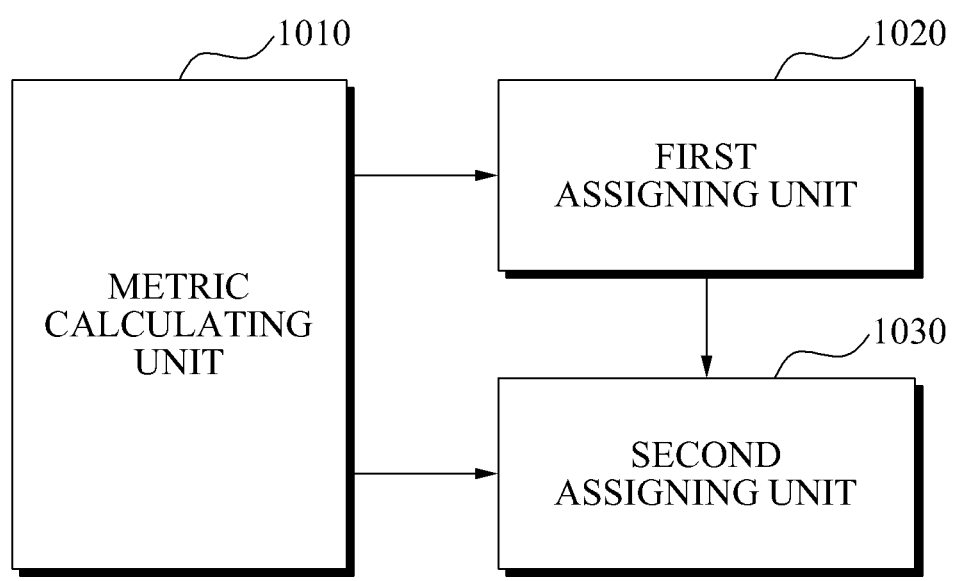
FIG. 10 is a block diagram illustrating an exemplary scheduling apparatus for a relay-based network.

FIG. 10 illustrates an exemplary scheduling apparatus for a relay-based network.

Referring to FIG. 10, the exemplary scheduling apparatus includes a metric calculating unit 1010, a first assigning unit 1020, and a second assigning unit 1030. The first assigning unit 1020 and the second assigning unit 1030 may be embodied as a single unit.

The metric calculating unit 1010 calculates first demand metrics, based on a queue length of a base station with respect to a plurality of relays or with respect to a plurality of terminals and based on an SINR of the plurality of relays or an SINR of the plurality of terminals with respect to the base station.

The first assigning unit 1020 assigns, in a first sub frame, a plurality of sub channels to links of the base station based on the first demand metrics corresponding to the links of the base station with respect to the plurality of sub channels.

The metric calculating unit 1010 updates a queue length of the base station with respect to the plurality of terminals or updates a queue length of the plurality of relays with respect to the plurality of terminals, based on the assigned result of the first sub frame. The metric calculating unit 1010 calculates second demand metrics corresponding to links of the plurality of relay stations or to the links of the base station.

The second assigning unit 1030 assigns, in a second sub frame, the plurality of sub channels to the links of the plurality of relays or to the links of the base station using the second demand metrics, based on the assigned result of the first sub frame.

Figure 11:
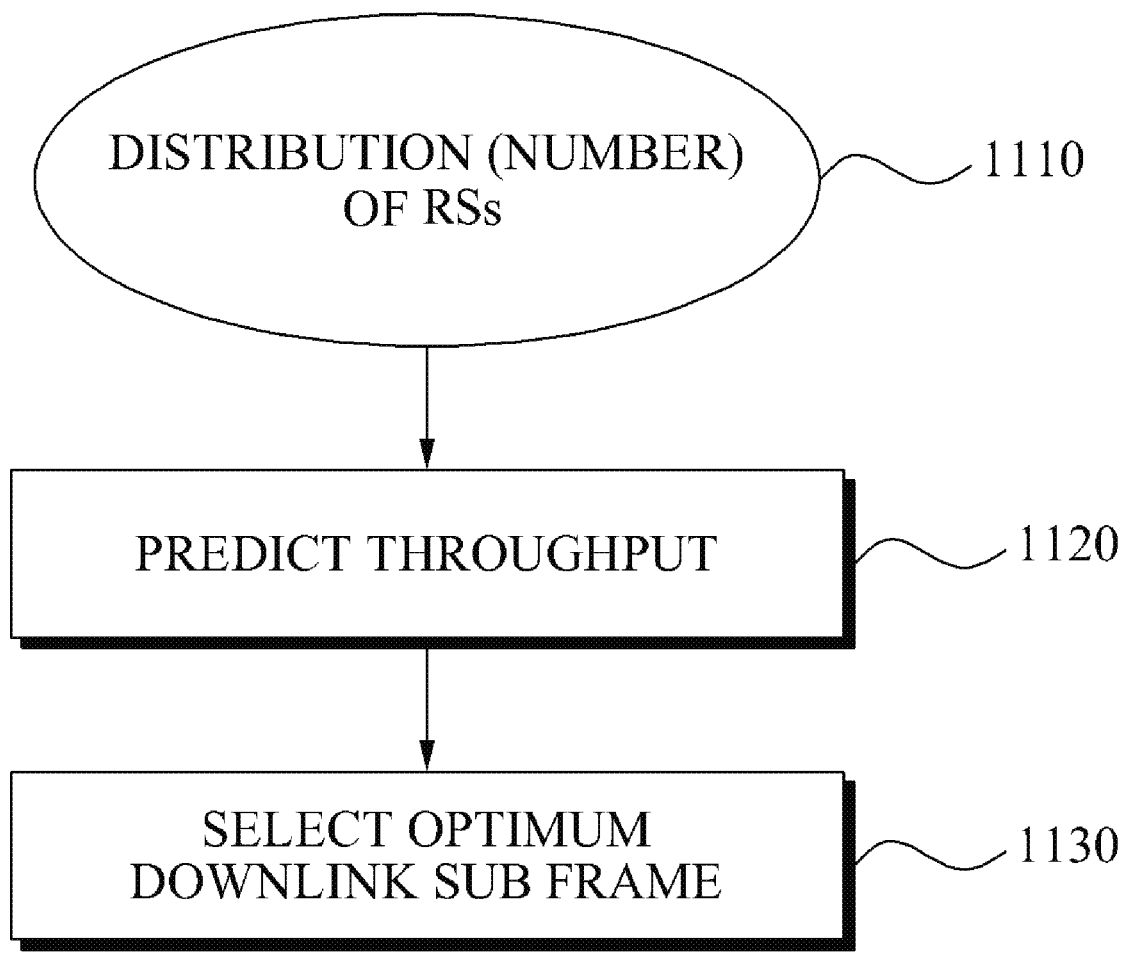
FIG. 11 is a diagram illustrating a factor and an exemplary selection process for selecting a type of a downlink sub frame used in a network.

FIG. 11 is a conceptual diagram illustrating a factor and an exemplary selection process for selecting a type of a downlink sub frame used in a network.

As a factor 1110 of FIG. 11 for selecting a type of the downlink sub frame to be used, a distribution/number of user terminals or a number of relay stations may be used. When a throughput of a network is previously calculated depending on the distribution/number of the user terminals or the number of the relay stations, some implementations may select an optimum type based on the distribution/number of the user terminals or the number of the relay stations.

In operation 1120, when the throughput of the network is not previously calculated depending on the distribution/number of the user terminals or the number of the relay stations, some implementations may predict throughputs with respect to various types of downlink sub frames based on the actual distribution/number of the user terminals or based on the number of the relay stations.

In operation 1130, the downlink sub frame having the optimum type may be selected based on the predicted throughputs. Accordingly, an optimum type of downlink sub frame from among multiple types of downlink sub frames may be selected, so as to increase the throughput of the network, and a scheduling may be performed using the selected type of downlink sub frame.

The scheduling method may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

According to example(s) described above, a downlink sub frame may be divided into a first sub frame and a second sub frame, and sub channels may be assigned to a base station or to a plurality of relay stations in each of the first sub frame and the second sub frame.

The plurality of sub channels may be assigned in the second sub frame based on an assigned result in the first sub frame, so as to improve a throughput of the network.

Accordingly, scheduling method or algorithm suited to various types of downlink sub frames may be provided.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A scheduling method for a relay-based network, comprising:

assigning, in a first sub frame, a plurality of sub channels to links of a base station based on first demand metrics corresponding to the links of the base station with respect to the plurality of sub channels; and assigning, in a second sub frame, the plurality of sub channels to links of a plurality of relays or the links of the base station based on an assigned result of the first sub frame, wherein:

a downlink sub frame includes the first sub frame in which the base station transmits a downlink signal to the plurality of relays or a plurality of terminals and the second sub frame in which the plurality of relays or the base station transmits a downlink signal to the plurality of terminals, and either:

the assigning, in the first sub frame, of the plurality of sub channels comprises assigning the plurality of sub channels to the links of the base station using a Hungarian algorithm, or the assigning, in the second sub frame, of the plurality of sub channels comprises assigning the plurality of sub channels to the links of the plurality of relays or to the links of the base station using the Hungarian algorithm.

2. The scheduling method of claim 1, wherein the assigning, in the second sub frame, of the plurality of sub channels comprises assigning the plurality of sub channels to the links of the base station or to the links of the plurality of relays, based on changes in a queue length of the base station with respect to the plurality of terminals or based on changes in a queue length of the plurality of relays with respect to the plurality of terminals, the changes being generated by assigning the plurality of sub channels to the links of the base station in the first sub frame.

3. The scheduling method of claim 1, further comprising:

calculating the first demand metrics based on a queue length of the base station with respect to the plurality of relays or to the plurality of terminals and a signal to interference plus noise ratio (SINR) of the plurality of relays or of the plurality of terminals with respect to the base station.

4. The scheduling method of claim 1, wherein the assigning, in the second sub frame, of the plurality of sub channels comprises:
- calculating second demand metrics corresponding to the links of the plurality of relays or the links of the base station, based on the assigned result of the first sub frame; and
- assigning the plurality of sub channels to the links of the plurality of relays or the links of the base station, based on the second demand metrics.

5. The scheduling method of claim 4, wherein the calculating of the second demand metrics comprises:
- updating a queue length of the base station with respect to the plurality of terminals or a queue length of the plurality of relays with respect to the plurality of terminals, based on the assigned result of the first sub frame; and
- calculating the second demand metrics, based on the updated queue length of the base station or the updated queue length of the plurality of relays and based on an SINR of the plurality of relays or the base station with respect to the plurality of terminals.

6. The scheduling method of claim 1, wherein the assigning, in the second sub frame, of the plurality of sub channels comprises equally assigning the plurality of sub channels to each of the plurality of relays or to the base station.

7. A scheduling method for a relay-based network, comprising:
- in response to a downlink sub frame being divided into multiple types depending on whether a plurality of terminals are operated as a plurality of receivers in a first sub frame and whether a base station is operated as a transmitter in a second sub frame,
- selecting a type used in the relay-based network from among the multiple types based on at least one of a number of a plurality of relays and a distribution of the plurality of terminals;
- assigning, in the first sub frame, a plurality of sub channels to links of the base station based on first demand metrics corresponding to the links of the base station with respect to the plurality of sub channels; and
- assigning, in the second sub frame, the plurality of sub channels to links of the plurality of relays or to the links of the base station, based on an assigned result of the first sub frame, wherein:
- a downlink sub frame includes the first sub frame in which the base station is operated as the transmitter and the second sub frame in which the plurality of terminals are operated as the plurality of receivers, and
- either:
  - the assigning, in the first sub frame, of the plurality of sub channels comprises assigning the plurality of sub channels to the links of the base station using a Hungarian algorithm, or
  - the assigning, in the second sub frame, of the plurality of sub channels comprises assigning the plurality of sub channels to the links of the plurality of relays or to the links of the base station using the Hungarian algorithm.

8. The scheduling method of claim 7, wherein the assigning, in the second sub frame, of the plurality of sub channels comprises assigning the plurality of sub channels to the links of the base station or the links of the plurality of relays, based on changes in a queue length of the base station with respect to the plurality of terminals or based on changes in a queue length of the plurality of relays with respect to the plurality of terminals, the changes being generated by assigning the plurality of sub channels to the links of the base station in the first sub frame.

9. A non-transitory computer-readable storage medium storing a program to perform scheduling for a relay-based network, the medium comprising instructions to cause a computer to:
- assign, in a first sub frame, a plurality of sub channels to links of a base station based on demand metrics corresponding to the links of the base station with respect to the plurality of sub channels; and
- assign, in a second sub frame, the plurality of sub channels to links of a plurality of relays or the links of the base station based on an assigned result of the first sub frame, wherein:
- a downlink sub frame includes the first sub frame in which the base station transmits a downlink signal to the plurality of relays or a plurality of terminals and the second sub frame in which the plurality of relays or the base station transmits a downlink signal to the plurality of terminals, and
- either:
  - the assigning, in the first sub frame, of the plurality of sub channels comprises assigning the plurality of sub channels to the links of the base station using a Hungarian algorithm, or
  - the assigning, in the second sub frame, of the plurality of sub channels comprises assigning the plurality of sub channels to the links of the plurality of relays or to the links of the base station using the Hungarian algorithm.

10. A scheduling apparatus for a relay-based network, comprising:
- a first assigning unit to assign, in a first sub frame, a plurality of sub channels to links of a base station based on first demand metrics corresponding to the links of the base station with respect to the plurality of sub channels; and
- a second assigning unit to assign, in a second sub frame, the plurality of sub channels to links of a plurality of relays or to the links of the base station, based on an assigned result of the first sub frame, wherein:
- a downlink sub frame includes the first sub frame in which the base station transmits a downlink signal to the plurality of relays or a plurality of terminals and the second sub frame in which the plurality of relays or the base station transmits a downlink signal to the plurality of terminals, and
- either:
  - the assigning, in the first sub frame, of the plurality of sub channels comprises assigning the plurality of sub channels to the links of the base station using a Hungarian algorithm, or
  - the assigning, in the second sub frame, of the plurality of sub channels comprises assigning the plurality of sub channels to the links of the plurality of relays or to the links of the base station using the Hungarian algorithm.

11. The scheduling apparatus of claim 10, further comprising:
- a metric calculating unit to calculate the first demand metrics, based on a queue length of the base station with respect to the plurality of relays or with respect to the plurality of terminals and based on a signal to interference plus noise ratio (SINR) of the plurality of relays or of the plurality of terminals with respect to the base station.

12. The scheduling apparatus of claim 10, wherein the first assigning unit assigns the plurality of sub channels to the links of the base station or to the links of the plurality of relays, based on changes in a queue length of the base station with respect to the plurality of terminals or based on changes in a queue length of the plurality of relays with respect to the plurality of terminals, the changes being generated by assigning the plurality of sub channels to the links of the base station in the first sub frame.

13. The scheduling apparatus of claim 11, wherein:
- the metric calculating unit calculates second demand metrics corresponding to the links of the plurality of relays or the links of the base station, based on the assigned result of the first sub frame, and
- the second assigning unit assigns the plurality of sub channels to the links of the plurality of relays or to the links of the base station, based on the second demand metrics.

14. The scheduling apparatus of claim 13, wherein the metric calculating unit updates the queue length of the base station with respect to the plurality of terminals or updates a queue length of the plurality of relays with respect to the plurality of terminals, based on the assigned result of the first sub frame.

\* \* \* \* \*